C. Neer.
Cracker Machine.
N° 20,577. Patented June 15, 1858.
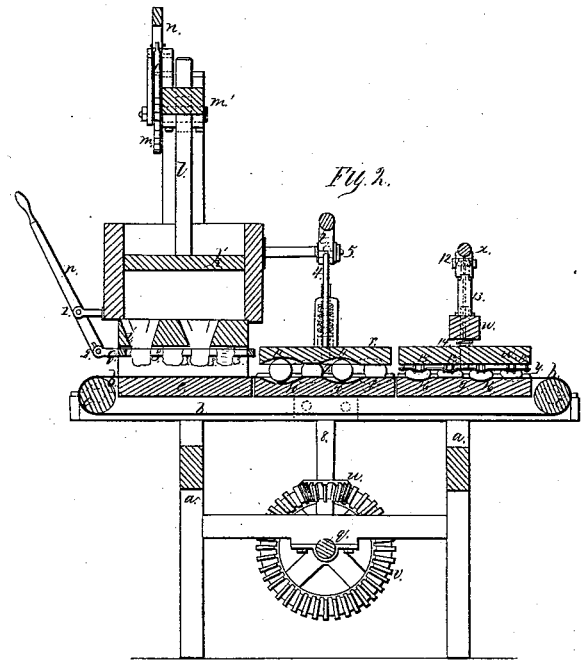
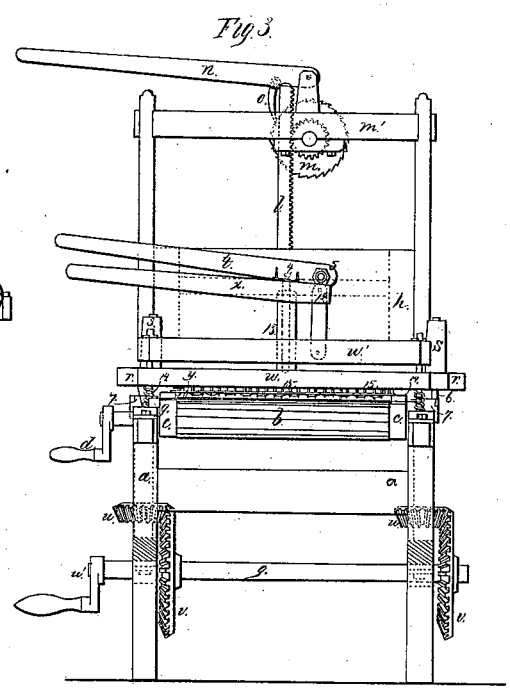
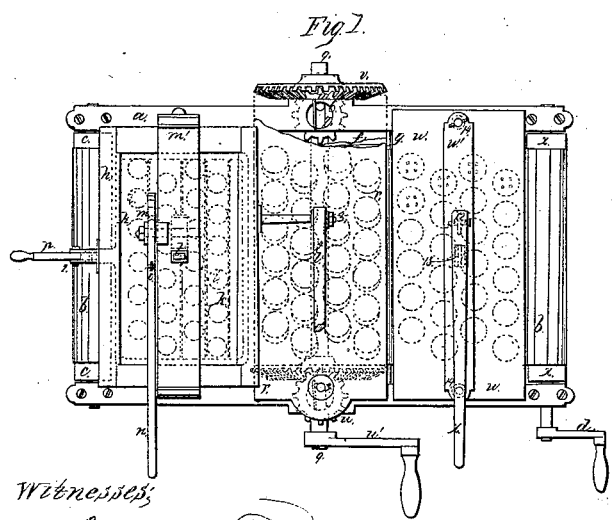
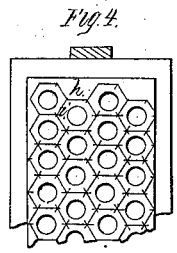
Witnesses:
James W. Flack
Chas. S. Flack
Inventor
Charles Neer

UNITED STATES PATENT OFFICE.

C. NEER, OF TROY, NEW YORK.

CRACKER-MACHINE.

Specification of Letters Patent No. 20,577, dated June 15, 1858.

*To all whom it may concern:*

Be it known that I, CHARLES NEER, of Troy, in the county of Rensselaer and State of New York, have invented, made, and applied to use certain new and useful Improvement in Machinery for Making Crackers; and I do hereby declare that the following is a full, clear, and exact description of the construction and operation of the same, reference being had to the annexed drawing, making part of this specification, wherein—

Figure 1, is a plan of said machine. Fig. 2, is a vertical section of the same. Fig. 3, is an end elevation, and Fig. 4, is a detached plan of part of the dough box and compression grating.

Similar marks of reference denote the same parts.

My invention is especially adapted to making "butter crackers" by machinery in a way corresponding to those made by hand, although my said machinery may be applied to the manufacture of any character of crackers to which it is adapted.

My invention applies, first, to a manner of consolidating the dough by forcing it through a grating of tapering holes, whereby the portions of dough, intended for each cracker, are separated sufficiently to afford the necessary space between each cracker, and the dough is consolidated, and then the pieces are cut off from below this perforated plate and dropped onto an apron or its equivalent by which said pieces are carried to the second point of my invention consisting of a series of cavities in the opposite faces of "workers", and a horizontal motion is given to the upper "worker" in such a manner that each piece of dough is rolled up or worked into nearly a ball and then flattened in a manner analogous to the operation of making butter crackers by hand, producing an article fully equal to the hand made crackers which in baking retain their sweetness whereas the machine made butter crackers have heretofore been far inferior to those made by hand, because the crackers would break and split apart in baking or handling, and the escape of the gases in baking, from the dough not being worked in such a manner as to produce a surface, and knead the edges of the dough into the cracker itself would injure the quality of said crackers. The third point of my invention relates to a manner of pressing the crackers to prevent them "puffing up," viz., the use of a concave bed, and convex stamp to flatten and arch the top of the cracker downward.

From the foregoing the operation of my machinery will be understood by reference to the drawing in which—

*a*, is a suitable frame.

*b*, is an endless apron around the rollers *c, c*.

*d*, is the handle by which the apron and the crackers are drawn along for the successive operations over the beds *e, f*, and *g′*.

*h*, is a box into which the dough—suitably mixed—is to be placed.

*i*, is a grating at the bottom of said box *h*, in which conical holes are formed as seen in Figs. 2, and 4.

*k* is a follower pressed down onto the dough by the rack *l*, pinion, and ratchet wheel *m*, on the frame *m′*, actuated by the lever *n*, and pawl *o*, or other suitable device.

After the dough is placed in the box *h*, the follower *k*, is pressed down onto the same, to consolidate the dough and force it into the grating *i*, a board having previously been slid under said grating and close up to the ends of the holes in said grating. The said board is then to be withdrawn and a frame *q*, inserted, which carries cross wires or knives 3, 3, and this frame is moved by the lever *p*, attached to said frame at 2, and set on the fulcrum 1. The follower *k*, is then brought down a gaged distance by the lever *n*, or its equivalent, which consolidates and squeezes out the proper amount of dough for one cracker from each opening in the grating *i*. The frame *q*, is then moved by the lever *p*, and the wires 3, 3, cut off the projecting pieces of dough which falling on the apron *b*, are carried along over the bed *f*, for the next operation, and the motions are repeated.

*r*, is the working board formed with cavities 11, 11, so placed as to act on the pieces of dough as they lie on the apron *b*. 10, 10, are similar cavities in the bed *f*. This working board *r*, is provided with spring boxes *s*, setting over the studs 6, which studs are on a cross piece keyed into a slot in the disks 7 on the upper end of vertical shafts 8, so that by keying the studs 6, at a greater or less distance from the axis of the shafts 8, said studs will travel in circles of greater or less diameter and these studs 6, 6, and shafts 8, 8, receiving a corresponding rotation from the pinions *u, u*, and wheels *v, v*, on the shaft 9, impart to the worker $r$, a concentric movement which causes the cavities 10 and 11, to roll each piece of dough up into a ball or nearly so. At the same time that I perform this working operation by turning the crank $u'$. I also bring pressure onto the dough by forcing down the worker $r$, by the lever $t$, (on a fulcrum 5) and a strut 4, connected to said lever by a ball joint, the springs in the boxes $s$, allowing of the descent of said worker to flatten, the pieces of dough and when this operation is complete said springs raise said worker $r$, and the apron $b$, is moved to bring the crackers beneath the stamping platen $w$. This platen or follower $w$, is raised by springs 14, and depressed by a lever $x$ on a fulcrum 12, connected to the cross frame $w'$, and 13, is the block on which said lever $x$, acts.

On the under side of this follower $w$, pins are inserted and name stamps if desired, and $y$ is a plate with perforations for passing said pins or stamps, and said plate is pressed away from the follower $w$, by suitable intervening springs, so as to press the crackers away from off the points of the pins. This plate $y$ is formed convex in those parts which come over the crackers as at 15, and the bed $g$ is hollowed down in the same positions at 16 so that the pressure from the lever $x$, both pierces, flattens and arches down the upper surfaces of the crackers to prevent them puffing up and cracking open while being baked. The crackers being now completed are to be delivered from the apron $c$, onto suitable pans for baking or conveyed away in any desired manner. If preferred pans might be introduced onto the apron $b$, said pans having the necessary concavities in place of those in the beds $f$ and $g$, but I prefer the apron as it acts more efficiently in working the crackers up into shape.

The beds $f$ and $g$, and followers $r$ and $w$, and the grating $i$ may be changed and others substituted for different sizes of crackers.

What I claim as my invention and desire to secure by Letters Patent is—

1. The grating $i$, perforated with conical holes in combination with the dough box $h$, and follower $k$, substantially as and for the purposes specified.

2. I claim the worker $r$, having the concentric motion specified, and provided with the cavities 11, substantially as and for the purposes specified.

3. I claim the plate $y$, formed with the convex parts 15, substantially as and for the purposes set forth.

In witness whereof I have hereunto set my signature this twenty sixth day of May 1858.

CHARLES NEER.

Witnesses:
 JOHN H. COLBY,
 ISAAC T. BAKER.